United States Patent [19]
Petcher

[11] 3,808,785
[45] May 7, 1974

[54] NUT HARVESTING DEVICE

[76] Inventor: Rhett R. Petcher, Rt. 8, Box 387, Roanoke, Va. 24014

[22] Filed: May 23, 1973

[21] Appl. No.: 362,882

[52] U.S. Cl............... 56/328, 56/13.1, 209/134
[51] Int. Cl............................................ A01d 51/00
[58] Field of Search ......... 56/328, 12.8, 12.9, 13.1, 56/30, 32; 209/134, 135

[56] References Cited
UNITED STATES PATENTS

| | | | |
|---|---|---|---|
| 2,502,810 | 4/1950 | Waters | 56/328 R |
| 2,593,625 | 4/1952 | Stokes | 56/328 R |
| 2,673,436 | 3/1954 | Urban | 56/13.1 |
| 2,781,625 | 2/1957 | Phelps et al. | 56/328 R |
| 2,978,859 | 4/1961 | Tubbs | 56/328 R |

*Primary Examiner*—Russell R. Kinsey
*Attorney, Agent, or Firm*—Bacon & Thomas

[57] ABSTRACT

Nuts are sucked up from the ground and collected in a receptacle after being separated from leaves and other debris. As the nuts and debris pass through a tapered separator located on top of the receptacle cover, they strike baffles within the separator and fall into the receptacle through passageways in the cover.

12 Claims, 7 Drawing Figures

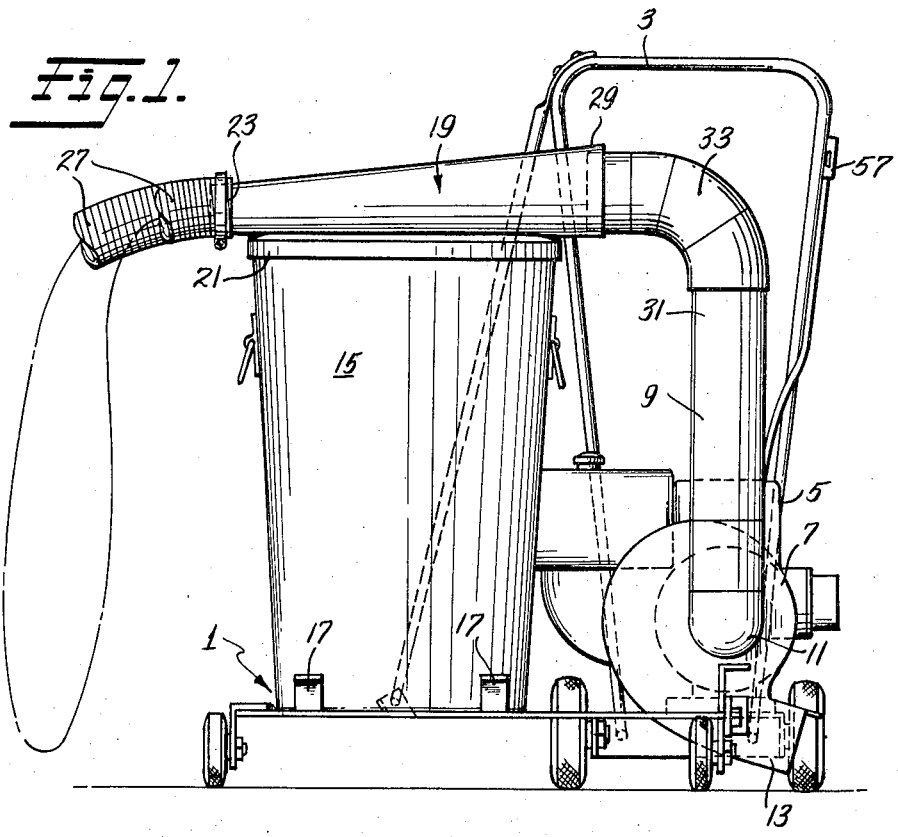
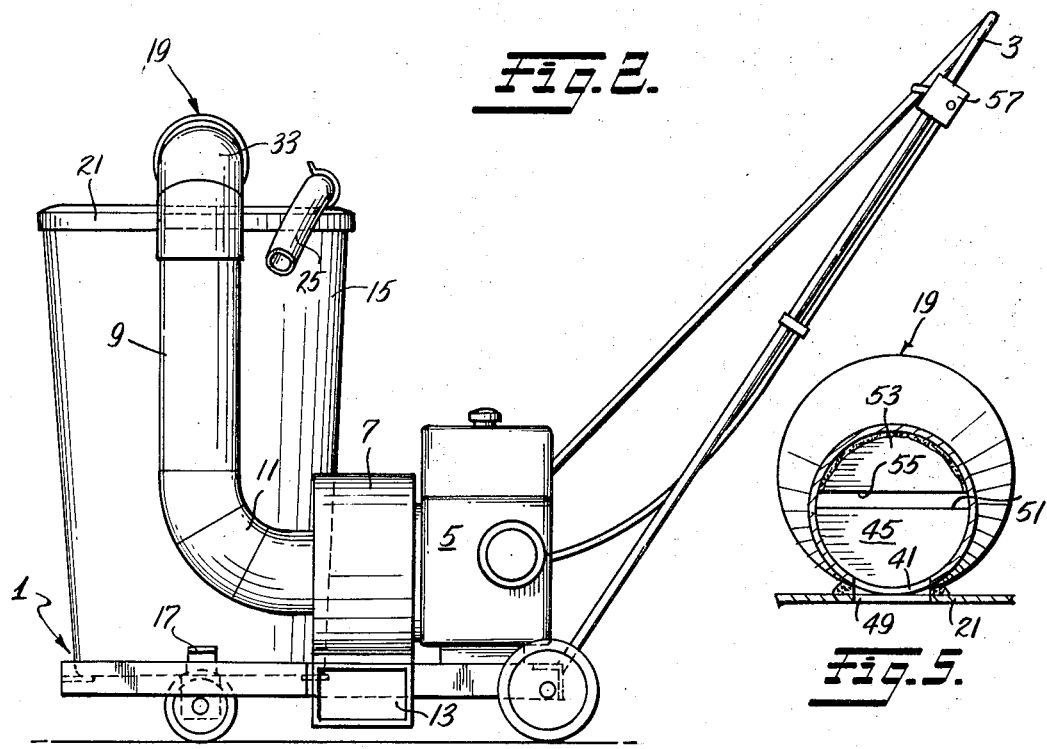

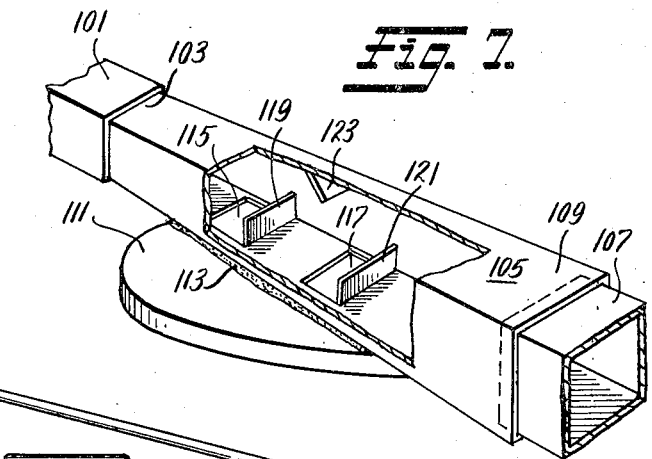
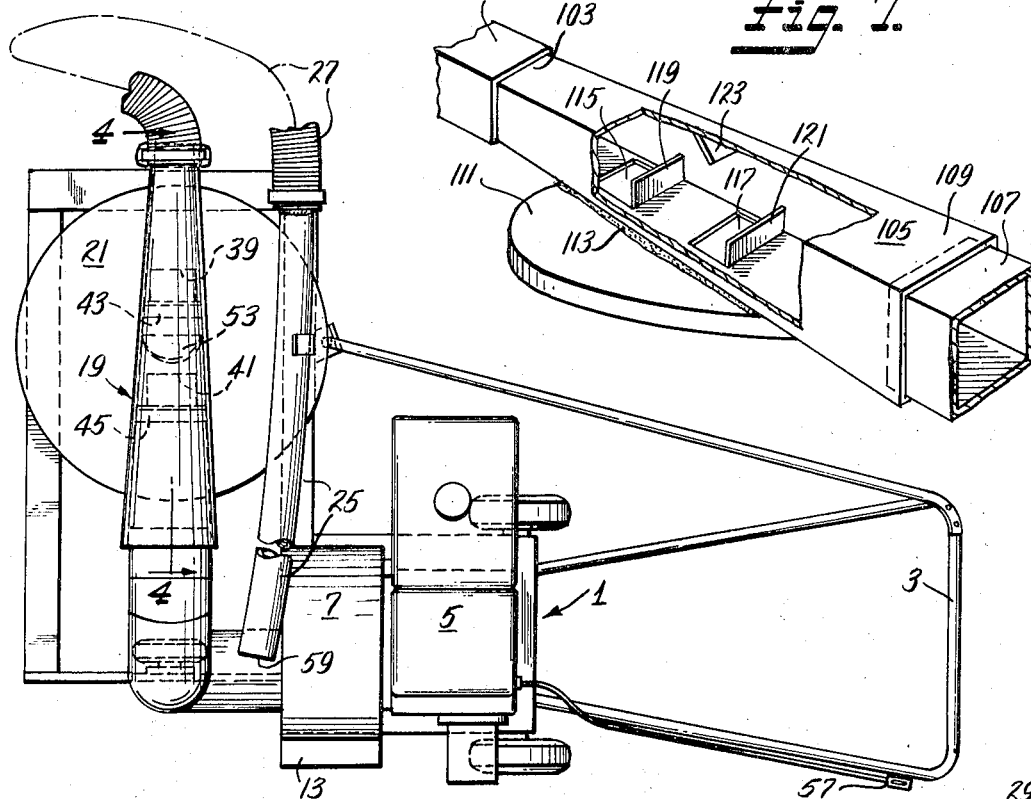
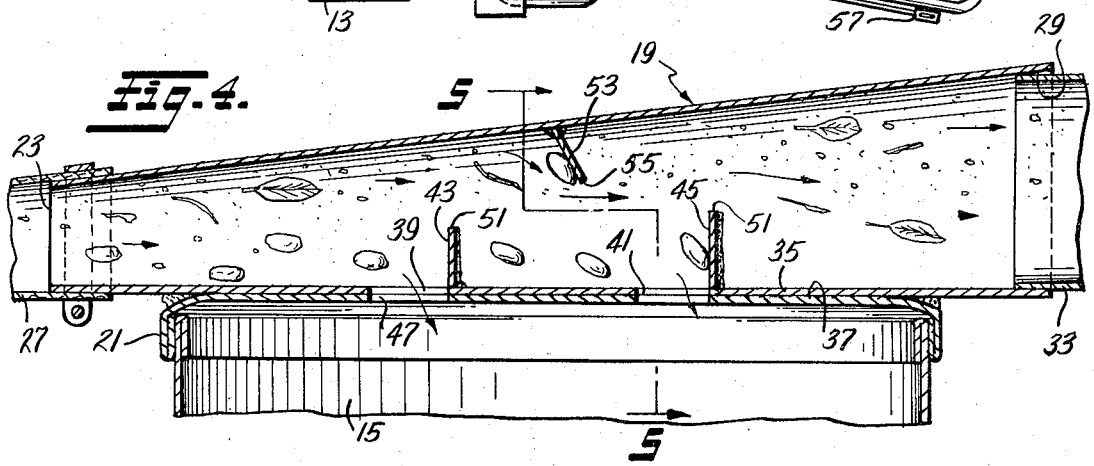
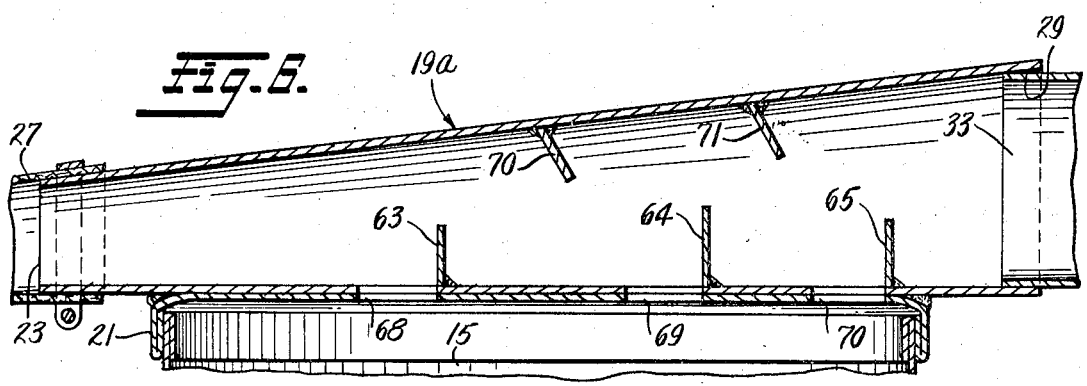

NUT HARVESTING DEVICE

This invention relates to an improved device for gathering nuts, such as pecans, from the surface of the ground where they have fallen from trees, and depositing them in a receptacle substantially free of debris, such as leaves, twigs, etc., which may be gathered with the nuts.

It is an object of this invention to provide a nut harvesting device adapted to separate sound nuts from unsound ones and debris.

Another object of the invention is to provide a nut harvesting device which is portable and which may be maneuvered around trees to collect all nuts which may have fallen to the ground.

A further object of the invention is to provide a nut harvesting device which is of strong, rugged construction and relatively inexpensive to manufacture.

These and other objects and advantages of the invention will become more apparent from the following specification when taken in conjunction with the drawings in which:

FIG. 1 is a front elevational view of the nut harvesting device;

FIG. 2 is a side elevational view of the nut harvesting device of FIG. 1;

FIG. 3 is a top plan view of the nut harvesting device of FIG. 1;

FIG. 4 is an enlarged, fragmentary, sectional view of the upper portion of the receptacle and the nut separating duct located on the receptacle cover taken on the line 4 — 4 of FIG. 3;

FIG. 5 is a fragmentary, sectional view taken on the line 5 — 5 of FIG. 4;

FIG. 6 is an enlarged, fragmentary, sectional view of a modified form of the device which is similar to the one shown in FIG. 4; and FIG. 7 is an isometric view, partly broken away, of a modified form of the nut separating duct and receptacle cover.

The present nut harvesting device, as shown in FIGS. 1, 2 and 3, includes a wheeled support platform, generally designated by the reference numeral 1, provided with a handle 3 for manually moving the device to the desired location.

An internal combustion engine 5 is mounted on the support platform 1 adjacent the rear edge thereof and is operably connected with the fan of a squirrel-cage type suction pump generally designated by the reference numeral 7. A vertically extending suction pipe 9 is connected with the intake of the suction pump 7 by a 90° elbow 11. The pipe 9 and elbow 11 may conveniently be of the type conventionally employed in connection with stoves or furnaces. The suction pump 7 is provided with a discharge passage 13 to the outer end of which a debris collecting bag or receptacle, not shown, may be attached.

A portable receptacle 15 is removable mounted on the support platform 1 adjacent one side thereof and is removably secured in place on the support platform 1 by suitable clips 17.

A frusto-conically shaped separator duct 19, which extends diametrically across the cover 21 of the receptacle 15, is fixedly secured thereto as by soldering, brazing or welding. The intake end 23 of the separator duct 19 is connected to an elongated, plastic suction pipe or nozzle 25 by a section of flexible suction pipe 27 while the outlet end 29 of the separator duct is connected with the upper end 31 of the pipe 9 by an elbow 33 which may be a conventional type, stove pipe elbow or a flexible conduit.

The structure and arrangement of the separator duct 19 is best shown in FIGS. 3, 4 and 5. The bottom wall or floor 35 of the separator duct 19 may, if desired, be flattened to conform to the upper surface 37 of the cover 21. A pair of rectangular shaped openings 39 and 41 are formed in the bottom wall 35 of the separator duct 19 by cutting or punching along three sides of the openings while leaving the metal to be displaced attached along the down-stream side of the openings and bending the flaps of the metal upwardly into the interior of the separator duct to provide upstanding baffles 43 and 45. If desired, these baffles may be formed separately and secured in place by welding. The baffles 43 and 45 preferably extend substantially perpendicular to the floor 35 of the separator duct 19 and extend transversely of the duct from substantially one side wall to the other side wall thereof. The cover 21 of the receptacle 15 is provided with openings 47 and 49 in alignment with the openings 39 and 41, the openings 39 and 47 and the openings 41 and 49 providing passageways for nuts to fall into the receptacle 15.

A baffle 53 disposed intermediate the baffles 43 and 45, is welded or otherwise fixedly secured to the top wall of the separator duct 19. The baffle 53 extends laterally across the duct and depends downardly and is inclined rearwardly toward the outlet end 29 of the separator duct. While the downwardly extending baffle 53 is shown as being welded to the inner surface of the duct 19, this baffle may be mounted in the duct for adjustment of its angular position. The lower edge 55 of the baffle 53 is preferable flat as shown in FIG. 5, and lies in a horizontal plane which is disposed above parallel horizontal planes passing through the flat, top wall 51 of the upstanding baffles 43 and 45.

For harvesting pecans, the separator duct 19, which may be formed of metal, plastic or other suitable material, is formed to be about 2½ inches in diameter at the intake end 23 thereof, approximately five inches in diameter at the outlet end 29 thereof, and approximately 20 to 25 inches in length. It has been found that the plastic intake pipe 25 and the flexible suction pipe 27 connected with the intake end 23 of the duct 19, should also be 2½ inches in diameter. A suitable size for the openings 39 and 41 in the bottom wall 35 of the separator duct 19 and the aligned openings 47 and 49 in the cover 21 for the passage of pecans into the receptacle is approximately 2¾ inches in the direction extending transversely of the duct and approximately 1¾ inches in the direction extending longitudinally of the duct. The upstanding baffle 45, being located where the cross sectional area of the duct is greater than at the baffle 43 and therefore where the rate of flow is reduced, is of somewhat greater height than the baffle 43.

In operating the device, the internal combustion engine 5 is started and the speed thereof is regulated by the control 57 mounted on the handle 3. By maneuvering the device under trees where nuts have fallen to the ground and by then holding the nozzle 59 of the plastic intake pipe 25 adjacent to the ground, nuts, together with leaves, twigs and other debris, will be sucked into the intake pipe 25 and the flexible pipe 27 by the suction created by the suction pump 7. As the nuts and debris flow through the separator duct 19, the sound nuts, which are somewhat heavier than unsound ones and other gathered material, strike the baffles 43, 45 or 53 and fall downwardly into the receptacle 15 through the openings 39 or 41 while debirs and unsound nuts pass to the suction pump discharge.

As the cross sectional area of the separator duct 19 increases progressively from the inlet to the outlet end, it follows that the speed or rate of flow of material through the duct decreases progressively from the inlet to the outlet end thereof. Thus as, the nuts and debris approach the upstanding baffle 43 they are traveling at a higher rate of speed then those which pass over the baffle 43 and approach upstanding baffle 45. Nuts which pass over the baffle 43 are deflected downwardly by the downwardly extending baffle 53 so that they strike the baffle 45 and fall into the receptacle through the opening 41. Preferably, the baffles 43 and 45 are positioned approximately six inches apart. The strong suction created by the suction pump 7 carries the leaves and lighter debris over the top of the baffles 43 and 45 and, although some of the debris may strike the baffle 53, it will not be deflected downwardly far enough to fall through the opening 41 but will pass into the elbow 33, the pipe 9, the elbow 11 and into the suction pump 7 from which it will be discharged through the passage 13, either onto the ground or into a debris collection bag or receptacle.

With the arrangement described, the cross sectional area of the separator duct at the outlet end is approximately four times the cross sectional area at the inlet end and the rate of flow of material diminishes accordingly from the inlet to the outlet end. The degree of suction created by the pump 7 should be regulated so that it is sufficient for conveying the debris straight through the separator duct while permitting substantially all of the sound nuts to strike the baffles and fall into the collection receptacle. The engine speed required for developing the optimum suction suitable for separating nuts from debris may be readily determined by experiment.

As illustrated in FIG. 4, the baffle 45 is higher than the baffle 43 and the top wall 51 of the baffles 43 and 45 is disposed substantially half way between the floor and the top wall of the duct. The distance between the lower edge 55 of the downwardly extending baffle 53 and the top wall 51 of the baffles 43 and 45 defines a passageway for the leaves and other light debris to pass in a substantially straight line through the separator duct 19.

A modified form of the separator duct 19a is shown in FIG. 6. The structure and arrangement of this form of the invention is similar to that already described above, the difference residing in the number of baffles provided within the interior of the separator duct and the number of passageways connecting the interior of the duct with the receptacle 15. Since the structure and arrangement of FIG. 6 is similar to that shown in FIGS. 1 – 5, the same reference numerals have been used to designate like parts.

The separator duct 19a of FIG. 6 includes upstanding baffles 63, 64 and 65 which extend transverseley of the separator duct 19 from substantially one side wall to the other side wall thereof and which are located at the down-stream side of passageways 68, 69 and 70, respectively. The passageways 68, 69 and 70, are preferably rectangular in shape and of a size to permit nuts to be separated to pass freely therethrough. The separator duct 19 is tapered from the inlet to the outlet end thereof and is preferably of frusto-conical configuration with the walls diverging at an angle of between 2° and 20°, and preferably diverging at an angle of 8°.

A baffle 70 disposed intermediate upstanding baffles 63 and 64 extends transversely of the separator duct 19a and is fixedly secured to the inner surface of the top wall of the duct. A similar downwardly extending baffle 71 is disposed transversely of the duct and secured to the top wall intermediate the baffles 64 and 65. The baffles 70 and 71 are inclined toward the outlet end of the separator duct so that leaves and other light material passing through the duct will not be deflected downwardly so as to strike the baffles 64 and 65 but will pass over the top of these baffles while the heavier sound nuts which do not fall through the passageway 68, will strike either baffle 70 or 71 and be deflected downwardly to strike either baffle 64 or 65 and fall into the receptacle through passageway 69 or 70.

It will be noted that the baffle 64, as shown in FIG. 6, is taller than either baffle 63 or 65. Thus, nuts which do not strike baffle 63 and fall into the receptacle through passageway 68, will be deflected downwardly by baffle 70 and strike upstanding baffle 64 and fall into the receptacle through passageway 69. Nuts which pass the baffle 64 will strike baffle 71, where the rate of flow of material through separator duct is appreciable slower than at the inlet portion thereof, and be deflected downwardly against baffle 65 and fall through passageway 70. A substantial space is provided in a vertical direction between the top edge of baffles 63, 64 and 65 and the bottom edge of baffles 70 and 71 for the free passage of leaves and other debris through the separator duct and to the suction pump 7.

In the modified form of the invention shown in FIG. 7 a suction pipe 101 is connected to the intake end 103 of the separator duct 105 and an outlet pipe 107 connects the outlet end 109 to the upper end of the suction pipe 9. This separator duct has planar top, bottom and side walls and is of square or rectangular configuration as viewed in transverse cross section. The separator duct 105 tapers uniformly from the intake end 103 to the outlet end 109 and the cross sectional area at the outlet end is approximately four times, greater than the cross sectional area at the intake end.

The receptacle cover 111, to which the separator duct 105 is secured as by welding 113, is provided with openings in alignment with the openings 115 and 117, in the bottom wall of the separator duct. Baffles 119 and 121 are fixed to the bottom wall at the downstream edge of the openings 115 and 117 and a baffle 123 rigid with the top wall of the separator duct depends downwardly and is inclined rearwardly toward the outlet end 109. This separator duct is constructed and arranged to separate nuts from undesirable debris in the manner described above.

It will be understood that the invention is not to be limited to the exact construction and arrangement shown and described, but that various changes and modifications may be made without departing from the spirit and scope of the invention, as defined in the appended claims.

What I claim is:

1. Apparatus for gathering nuts from the ground and separating them from debris, comprising: a receptacle; a cover removably mounted on said receptacle; a duct, having an inlet opening at one end and an outlet opening at the other end, rigid with said cover and extending thereacross; the wall of the duct diverging from said inlet to said outlet opening; the interior of the duct being connected with the interior of the receptacle by a plurality of passageways larger in size than the size of a nut to be gathered and separated from debris; an upstanding baffle mounted transversely in the duct at the downstream edge of each of said passageways, the baffles extending upwardly from the floor of the duct; a downwardly extending baffle mounted transversely in the duct intermediate the upstanding baffles: a flexible hose having an inlet at one end and connected at the other end thereof with the inlet of said duct; and means for creating a flow of air inwardly through the duct inlet and out through the duct outlet.

2. Apparatus according to claim 1, in which the duct is of generally frusto-conical configuration and the lateral side walls of the duct diverge at an angle of between 2° and 20°.

3. Apparatus according to claim 1, in which the passageways are of generally rectangular configuration.

4. Apparatus according to claim 3, in which the upwardly extending baffles extend upwardly from the floor of the duct to generally midway to the duct ceiling.

5. Apparatus according to claim 3, in which a downwardly extending baffle is disposed intermediate each pair of adjacent, upwardly extending baffles and at least one of said donwwardly extending baffles is inclined from the duct ceiling toward the duct outlet.

6. Apparatus according to claim 1, in which said duct is welded to the cover and the upwardly extending baffles are integral with the bottom wall of the duct.

7. Apparatus according to claim 1, in which the receptacle is portable and is mounted on a wheeled vehicle; and said means for creating a flow of air through said hose, comprises a power operated suction pump mounted on the vehicle with the inlet of the suction pump connected with the outlet of said duct.

8. Apparatus according to claim 1, including at least two downwardly extending baffles.

9. Apparatus according to claim 1, in which said upwardly extending and said downwardly extending baffles are of generally rectangular configuration.

10. Apparatus according to claim 1, in which a horizontal plane extending through the uppermost edge of the upstanding baffles is spaced below a second horizontal plane extending through the lowermost edge of the downwardly extending baffle.

11. Apparatus according to claim 1, in which the cross sectional area of said duct at the outlet end thereof is substantially four times greater than the cross sectional area at the inlet end thereof.

12. Apparatus according to claim 1, in which the duct is of generally frusto-pyramid configuration.

* * * * *